(No Model.)
JOHN McKAY & JAMES McKAY.
BICYCLE RAILWAY.
No. 566,926. Patented Sept. 1, 1896.
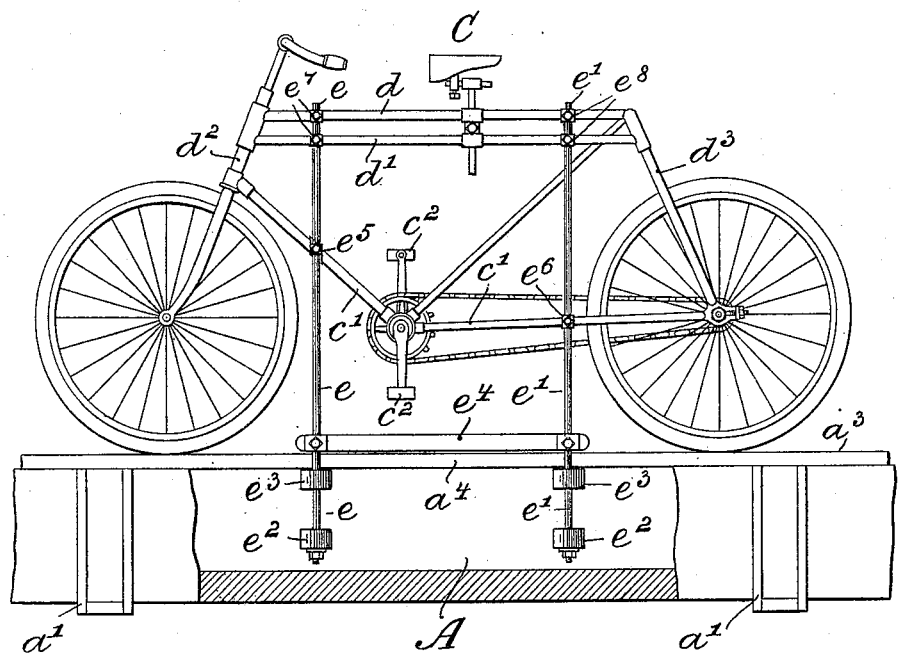
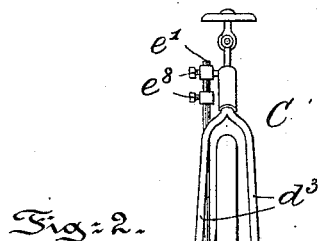
Witnesses:
Thomas M. Smith.
Richard C. Maxwell.
Inventors:
John McKay and James McKay,
By J. Walter Douglass,
Attorney.

UNITED STATES PATENT OFFICE.

JOHN McKAY AND JAMES McKAY, OF PHILADELPHIA, PENNSYLVANIA.

BICYCLE-RAILWAY.

SPECIFICATION forming part of Letters Patent No. 566,926, dated September 1, 1896.

Application filed July 2, 1896. Serial No. 597,832. (No model.)

*To all whom it may concern:*

Be it known that we, JOHN McKAY and JAMES McKAY, citizens of the United States, residing at the city of Philadelphia, in the county of Philadelphia and State of Pennsylvania, have invented certain new and useful Improvements in Bicycle-Railways, of which the following is a specification.

Our invention relates to a bicycle-railway, and more particularly to the construction of the road-bed and to means adapted to be connected therewith for maintaining a vehicle, such as a bicycle, in required upright position to avoid in the use of the same any possible disengagement of the wheels thereof from the track or way of the sunken structure.

The principal objects of our invention are, first, to provide a sunken bed provided with a U-shaped trough and with a flat track or way connected therewith, the trough of the bed being adapted to receive a traveler roller guiding means provided with uprights connected with the vehicle for supporting the same in a vertical position and to afford the rider of the vehicle safety in the use of the same; second, to provide a roller traveling means adapted to engage and travel in the trough of a bed sunk into the ground and having a flat track, rail, or way upon which the wheels of the vehicle are adapted to engage and travel and roller means provided with uprights adapted to be secured to the framework of the vehicle for the maintenance of the vehicle in an upright position, while impelling the same without derailment, and, third, to provide a U-shaped trough adapted to be sunk into the ground and with a track, way, or rail connected with one portion of said bed, upon which the wheels of a vehicle are adapted to rest and to be impelled over the same, rollers connected with uprights adapted to engage the trough of said bed, and with an adjustable guide connected with said uprights adjacent to the top surface of said track, rail, or way, the uprights being connected with the framework of the vehicle and adapted to support the same with the wheels thereof in contact with the track, rail, or way out of the path of the rider and affording thereby a means for novices in bicycling to learn to mount and impel a vehicle without fear of overturning of the vehicle and at the same time providing a healthful sport for pleasure and amusement, due to the construction and arrangement of the bed and the application of a vehicle thereto especially adapted for summer and other resorts.

Our invention consists of a bicycle-railway constructed and arranged in substantially the manner hereinafter described and claimed.

The nature and general scope of our invention will be more fully understood from the following description, taken in connection with the accompanying drawings, forming part hereof, and in which—

Figure 1 is a side elevational view of a bicycle supported in a vertical position from uprights connected with traveler roller-guides tied by an adjustable longitudinal rod, said roller-guides mounted in a U-shaped trough provided with a track, way, or rail on one side thereof embodying main features of our invention; and Fig. 2 is a vertical section through the bed and a rear view of the vehicle adapted for use in connection therewith.

Referring to the drawings, A represents the U-shaped bed, provided with inclined braces $a'$ and $a^2$ on both sides thereof to support the sides of the bed and at the same time to form means whereby when the bed is sunk in the ground B a substantial structure is provided and which by said braces, through the packing of earth or other matter around about the same, the trough or U-shaped bed is firmly secured to position in the ground.

$a^3$ is a rail, track, or way extending longitudinally of the trough to one side thereof and arranged so as to form a flange $a^4$, overlapping the trough at the top, for a purpose to be presently explained.

C is a bicycle with its appurtenances or attachments of substantially the ordinary construction, with the exception that the upper portion of the same, having reference to the framework thereof, is slightly modified to adapt the vehicle to a railway of our invention, in that two cross-bars $d$ and $d'$ extend from the front to the rear forked frames $d^2$ and $d^3$ of the vehicle C by means of collars secured to said frames $d^2$ and $d^3$.

$e$ and $e'$ represent two vertical rods provided at the lower portions with two sets of rollers $e^2$ and $e^3$, adapted to engage the wall of the trough of the bed A. The upper rollers $e^3$ of each rod are located adjacent to the flange $a^4$ of the track, way, or rail $a^3$ of the bed A. Above the platform or rail of the bed is located a longitudinal strip $e^4$, adjustably secured to the uprights $e$ and $e'$. These uprights, by means of collars $e^5$ and $e^6$, are secured to the backbone $c'$ of the vehicle C, and at the upper end of the cross-bars $d$ and $d'$ by means of similar collars or sleeves $e^7$ and $e^8$, to firmly support in upright position the vehicle to said rods $e$ and $e'$ out of the way of the rider, and so as to afford free use of the pedals $c^2$ in impelling the vehicle over the track, way, or rail $a^3$ of the bed A with certainty and without possible derailment of the vehicle C. The longitudinal rod $e^4$ of the uprights $e$ and $e'$ is made adjustable, so as to be brought closer to or farther from the rail, track, or way $a^3$ of the bed A, or to compensate for different widths of the rail, way, or track that may be employed in the roadbed A, and, moreover, to bring the guide-rod $e^4$ of the uprights $e$ and $e'$ into such a position as that the upper series of rollers $e^3$, mounted in the trough of the bed, may be nearer to or farther from the under side of the overlapping portion $a^4$ of the track, way, or rail $a^3$, to prevent any possible disengagement of the vehicle or undue wabbling of the same in the travel thereof over the rail $a^3$ of the bed A.

Having thus described the nature and objects of our invention, what we claim as new, and desire to secure by Letters Patent, is—

1. A bicycle-railway provided with a sunken bed provided with a U-shaped trough and a rail, track or way overlapping the trough, a vehicle connected with uprights provided with roller means engaging said trough so as to prevent derailment in the impelling of the vehicle, substantially as and for the purposes described.

2. In a bicycle-railway, a sunken bed provided with a trough having an overlapping rail or trackway, a vehicle adapted to engage said trackway and supported in vertical position by means of uprights provided with an adjustable guide-rod, and roller means engaging said trough, substantially as and for the purposes described.

3. In a bicycle-railway, a U-shaped trough set into the ground with a rail connected with one portion thereof, roller means provided with uprights, and a longitudinal adjustable guide-rod connected therewith, said uprights secured to the framework of a vehicle so as to maintain the same in an upright position, substantially as and for the purposes described.

4. The combination, with a bicycle provided with uprights connected with a cross-frame located below the saddle of the vehicle, of roller means connected with the lower end of said uprights, an adjustable guide-rod connected with said uprights, said roller means adapted to engage a trough below a rail or trackway and the guide-rod of said uprights located on the opposite side of said rail or trackway, substantially as and for the purposes described.

In testimony whereof we have hereunto set our signatures in the presence of two subscribing witnesses.

JOHN McKAY.
JAMES McKAY.

Witnesses:
  J. WALTER DOUGLASS,
  THOMAS M. SMITH.